Oct. 7, 1969   L. R. SHALLENBERGER ET AL   3,470,785
TEACHING AID FOR ELECTRIC KEYBOARD INSTRUMENT
Filed Aug. 14, 1967   3 Sheets-Sheet 1

INVENTORS
LARRY R. SHALLENBERGER
JAMES S. SOUTHARD
BY
Mueller, Aichele & Rauner
ATTYS.

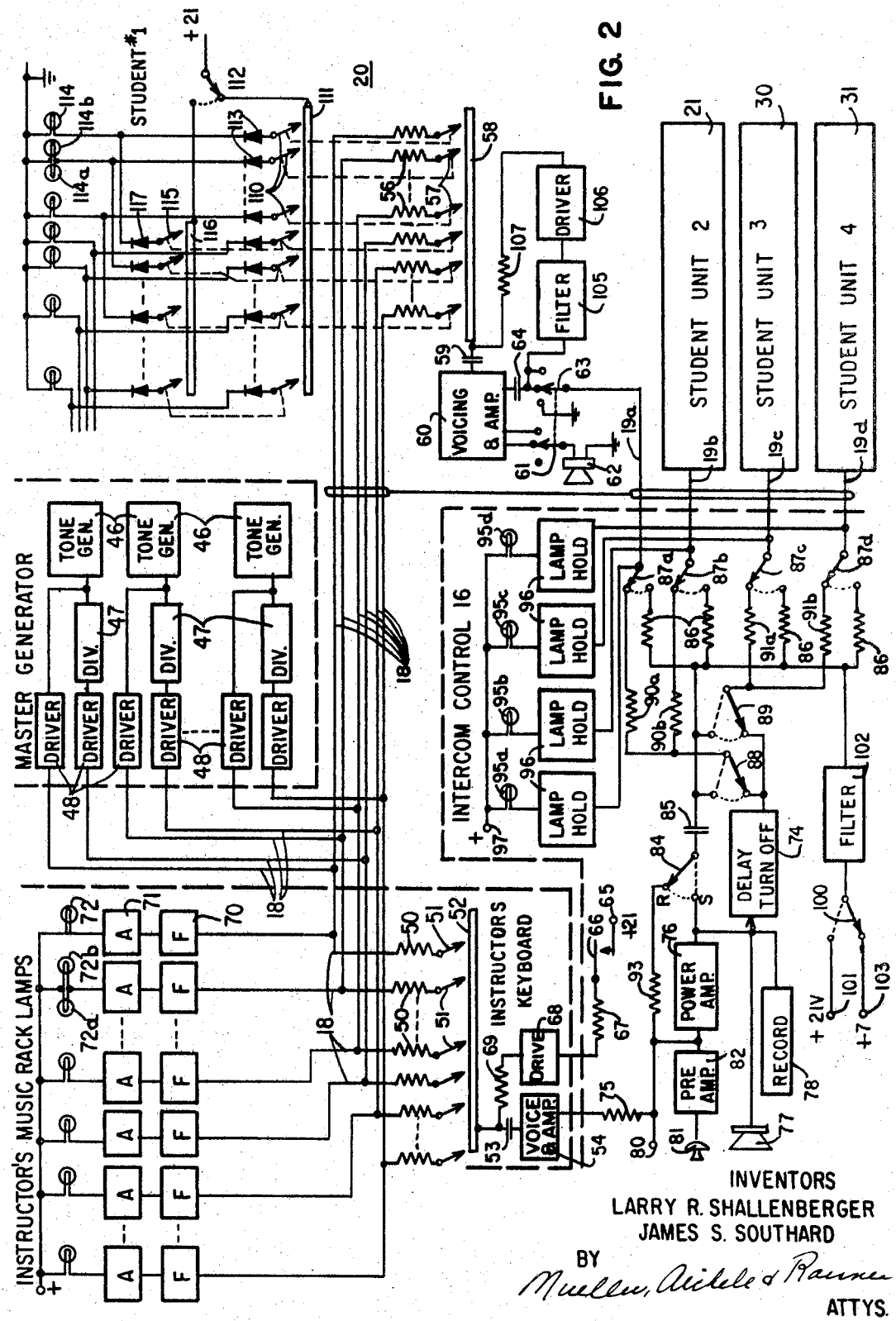

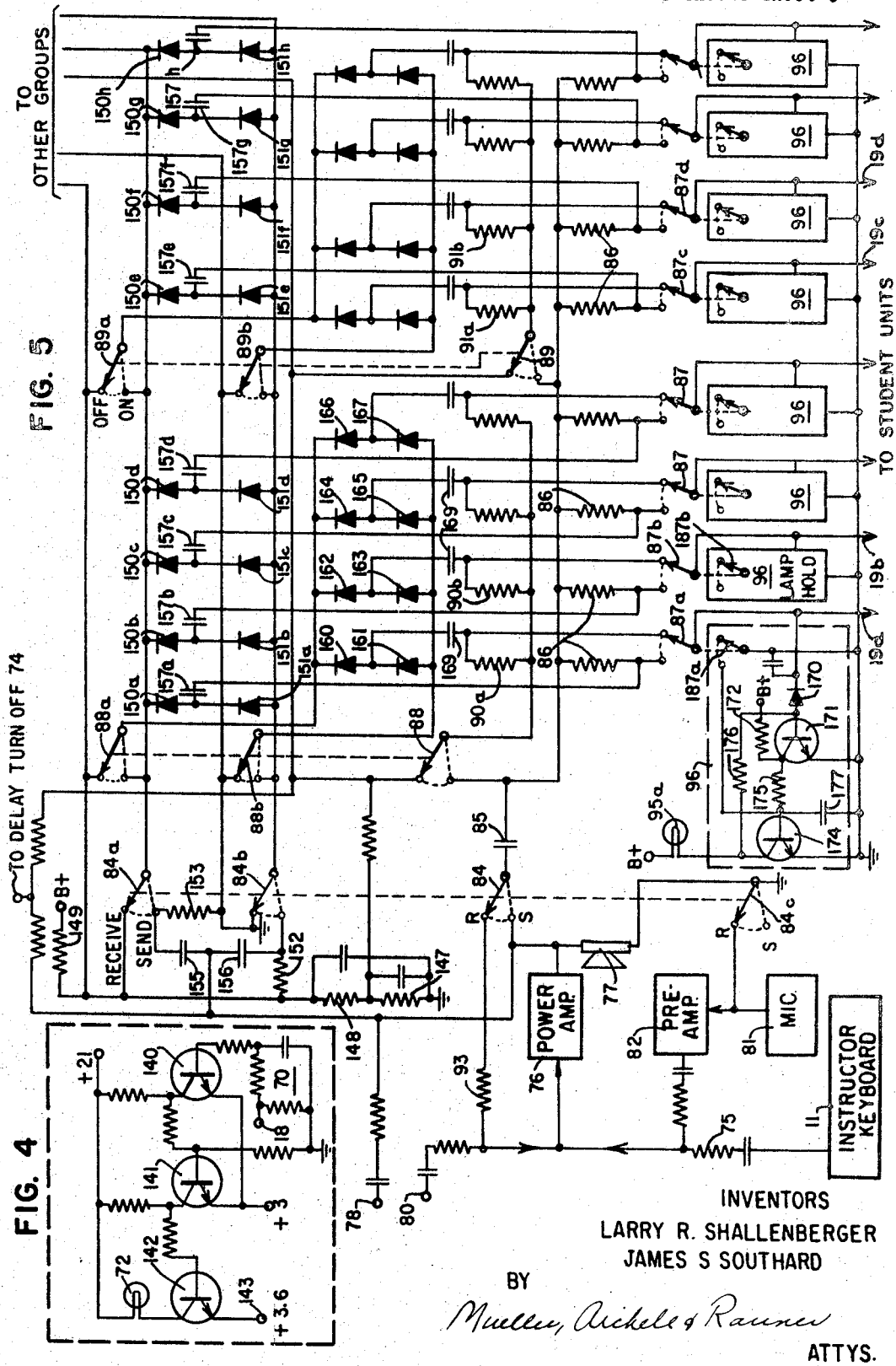

United States Patent Office 3,470,785
Patented Oct. 7, 1969

3,470,785
TEACHING AID FOR ELECTRIC KEYBOARD INSTRUMENT
Larry R. Shallenberger, Elkhart, and James S. Southard, Bristol, Ind., assignors to C. G. Conn, Ltd., Elkhart, Ind., a corporation of Indiana
Filed Aug. 14, 1967, Ser. No. 660,376
Int. Cl. G09b 15/00
U.S. Cl. 84—470                                    17 Claims

ABSTRACT OF THE DISCLOSURE

Electronic keyboard instrument teaching aid including master generator applying tones to conductors connected to keyboard at instructor's console and keyboards at student units for selection thereby. A single communication line between the instructor's console and each student unit permits the instructor to actuate an indicating system so that keys played by a selected student apply potentials through the conductors to actuate lamps on the instructor's music rack. The instructor can communicate with a selected student over the line and music played by the instructor as well as recorded music can be transmitted to the student, and music played by the student can be heard by the instructor and/or recorded. The instructor can select an individual student or a group of students.

BACKGROUND OF THE INVENTION

The teaching of students to play keyboard musical instruments such as pianos and organs has been largely on an individual basis. Although this has many advantages, the cost is high and to hold the instructor's time to a minimum the student is expected to practice between lessons without supervision. The student can, therefore, make errors which are not detected and can play incorrectly until corrected by the instructor at the next lesson under the instructor's supervision. Group instruction has been used but facilities have not been available to permit adequate communication between the instructor and an individual student. Also, the instructor has not been able to monitor an individual student's work.

To provide a large number of musical instruments such as electronic organs or pianos for a number of students involves substantial cost. To reduce cost, practice keyboards have been provided for the students which do not produce the same sounds as the instrument the student is learning to play. This causes a problem in that the student must adjust from one instrument to another. On the other hand, if all of the instruments produce the normal musical sounds simultaneously it is hard to tell which students are playing correctly. The instructor therefore cannot easily monitor and correct a particular student.

SUMMARY OF THE INVENTION

It is, therefore, an object of this invention is to provide a relatively simple teaching arrangement wherein a plurality of students can operate keyboards to key signals from a single master generator to produce musical tones which can be individually monitored by an instructor.

Another object of the invention is to provide a keyboard teaching aid which includes a plurality of student keyboards and a control system whereby the instructor can selectively listen to the music played by any one of the students and view lights indicating the notes played, and can communicate with the students to facilitate the teaching process.

In accordance with the invention, a keyboard electronic musical instrument teaching aid includes a master tone generator providing a plurality of tones applied through conductors to the instructor's and student's keyboards, with a communicating system having a single line from the instructor to each student which provides commmunication between the instructor and the students. The instructor can selectively actuate a control for applying a signal over the line to a particular student unit, or a group of student units, to trigger a circuit which applies potentials to the conductors to energize lights at the instructor's music rack to show the notes played by the selected student. The communicating systems can also be used for voice communication between the instructor and the students, to transmit musical tones played by the instructor, as well as recorded music, to the students, and to permit the instructor to listen to and/or record the music played by the students. The student keyboard can also energize lights for the student to see the notes played, and the lights are used with charts and are positioned to indicate the positions of the notes on the scale. The system can be automatically turned off when there has been no signals from the instructor or any of the students for a period of time.

BRIEF DESCRIPTION OF THE DRAWINGS

FIG. 2 is a schematic diagram of the system of FIG. 1;

FIG. 4 is a circuit diagram of the lamp driver circuit at the instructor's console; and FIG. 5 is a circuit diagram of the master control unit.

DESCRIPTION OF THE PREFERRED EMBODIMENT

Figure 1:
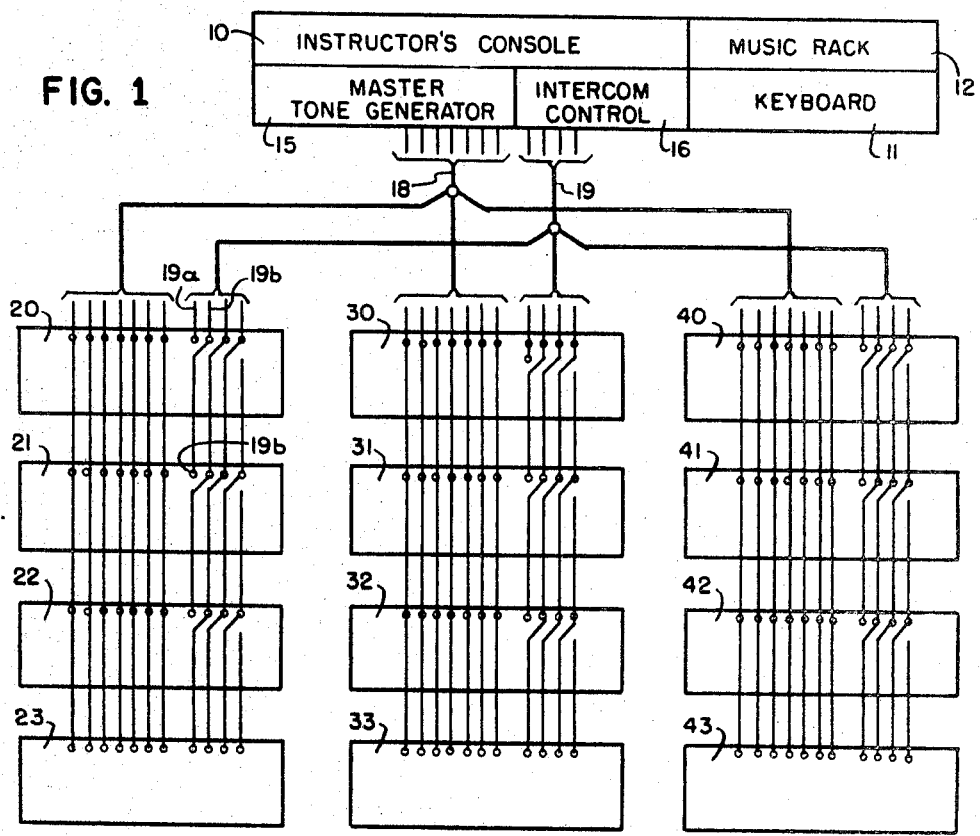
FIG. 1 illustrates the arrangement and interconnection of the instructor's console and the student units of the keyboard teaching aid of the invention.

Referring now to the drawings, in FIG. 1 there is shown a block diagram of the student teaching aid system of the invention. The instructor's console 10 includes a keyboard 11 for the instructor and a music rack 12 having lights thereon to indicate notes played either by the instructor or by a student, as will be explained. A master tone generator 15 provides tone signals for the instructor's and the student's keyboards. An intercom control unit 16 permits the instructor to control the various modes of operation of the teaching aid equipment.

A plurality of conductors 18 apply the tones from the master tone generator 15 to the various student keyboards. The student keyboards are arranged in groups, with the student units 20, 21, 22 and 23 being in one group, the units 30, 31, 32 and 33 being in a second group, and the units 40, 41, 42 and 43 being in a third group. Various numbers of groups and units can be provided, and practical systems can have from two to five groups with each group including from three to six student units.

Conductors 19 provide innercommunication between the instructor and the students, and may be included with the conductors 18 in a single cable extending to the various student units. A single flat multi-conductor cable can be used extending from the instructor's console through the units of each group. A single conductor is required for innercommunication between the instructor's console and each student unit and wiring can be provided within the student units so that the connection at each unit is the same. As shown in FIG. 1, conductor 19a terminates at unit 20 and the next conductor 19b is offset by one position in unit 20 so that it terminates in the student unit 21 at the same position as in unit 20. Similarly, the conductors which provide the intercom connection are offset to terminate at the same position in each student unit. Parallel cables can extend from the master tone generator 15 and intercom control 16 of the instructor's console to the student units 30 to 33 in the second group and to the student units 40 to 43 in the third group.

FIG. 2 shows the innerconnections and co-operation of the parts of the system of FIG. 1. The master generator 15 includes a plurality of tone generators 46 to provide the tones for an octave. Only three of the twelve generators are illustrated. To provide tones in other octaves the frequencies of the generators 46 are divided by frequency dividers 47. Although in FIG. 2 only one set of dividers is shown, additional sets of dividers can be provided for additional octaves. The tones from the generators 46 and from the dividers 47 are applied to driver amplifiers 48 which increase the level of the tones and apply the same to the conductors 18. As previously stated, the conductors apply the tones to the instructor's keyboard 11 and also to the student units 20, 21, 30 and 31. In FIG. 2 for simplicity only four student units are shown, the units 20 and 21 in the first group and the units 30 and 31 in the second group, but it will be apparent that more units can be used in the system.

The conductors 18 are connected through resistors 50 to the key contacts 51 at the instructor's keyboard 11. When a particular key is operated, the contact 51 thereof applies the tone to the bar 52, and it is coupled through capacitor 53 to the voicing and amplifier unit 54 of the instructor's unit. The output of this amplifier is applied to the intercom control 16 as will be described.

The tones from conductors 18 are also applied to the student units, and in unit 20 the conductors 18 are connected through resistors 56 to the contacts 57 operated by the keys of the student keyboards. When a key is operated, the contact 57 applies the tone signal to the bar 58 from which it is coupled through capacitor 59 to the voicing and amplifier unit 60. The output of the amplifier may be applied through switch 61 to a loudspeaker 62 so that the student can hear the tones played.

The instructor's console includes provisions for indicating the notes played. Positive potential at terminal 65 is applied through switch 66 and resistor 67 to driver amplifier 68 which applies a direct current potential through resistor 69 to the rod 52. When a key is operated, the direct current potential on the rod 52 is applied through the resistor 50 associated with the contact 51 and through conductor 18 to a filter 70 which passes only the direct current potential. This potential operates a trigger amplifier 71 which energizes indicator light 72 provided on the instructor's music rack. As will be explained, the light 72 can be used with charts to indicate the position on the scale of the notes played. It wil be noted that the direct current potential applied to the rod 52 is connected through the contacts 51 and the resistors 50 to the conductors 18 on which the ones from the master generator 15 are applied to the contacts. The filter 70 acts to reduce the tone signal and pass only the direct current potential to the amplifier 71.

The intercom control 16 at the instructor's console has facilities for selecting various modes of operation. The output of the voicing and amplifier unit 54 connected to the instructor's keyboard is applied through resistor 75 to power amplifier 76, and the output can be reproduced by loudspeaker 77 or recorded by recording device 78. Headphones can be substituted for the loudspeaker 77 so that the sound is restricted. A jack 80 is provided for the introduction of a high level signal, such as the output of a recording device, to the intercom system. The microphone 81 is connected through pre-amplifier 82 to the power amplifier 76.

When the instructor wishes to speak to a student, switch 84 is moved to the send (S) position so that the output of the power amplifier 76 is applied therethrough and through capacitor 85 and resistors 86 to the contacts of switches 87 which select individual students. Assuming the switch 87a is operated, the output of the power amplifier is applied therethrough and through conductor 19a to the student unit 20.

At the student unit 20, the signal on line 19a is applied to switch 63 which is coupled to switch 61. These switches provide positions for the student to listen, and to call and talk to the instructor. The center solid line position is for listen, the position to the right is to talk, and the position to the left is to call. When the switches 61 and 63 are in the positions shown, the signal on conductor 19a is applied through capacitor 64 to amplifier 60, and from the amplifier 60 through switch 61 to speaker 62, so that the student at the unit 20 will hear the voice of the teacher. This connection can aso be used for the student to listen to music produced by operation of the instructor's keyboard or recorded music applied at the intercom control 16. This operation will be described in more detail in connection with FIG. 3.

Group switches 88 and 89 are provided in the control 16 for applying signals to a group of students rather than to an individual student. When the switch 88 is actuated to the dotted position, signals received through capacitor 85 are applied to resistors 90a and 90b connected to the normally closed or off contacts of switches 87a and 87b for applying signals to the student units 20 and 21, respectively. It will be noted that if either of the switches 87a or 87b is actuated, the connection will not be made through the group switch, but the connection previously described through the individual switch will apply the signal from capacitor 85 to the student line 19. Switch 89 establishes a connection through resistors 91a and 91b to the student switches 87c and 87d connected to student units 30 and 31.

In order for the instructor to listen to the music played by an individual student, such as the student at unit 20, switch 84 must be placed in the receive (R) position, the individual switch 87a will again be operated. Signals from amplifier 60 will be applied through capacitor 64, switch 63, conductor 19a, switch 87a, resistor 86, capacitor 85, switch 84 and resistor 93 to the input of power amplifier 76. The amplified signal will then be reproduced by headphone 77 so that the instructor can hear the music played by an individual student. An individual student can operate the switches 61 and 63 to the position at the right, and in this position the speaker 62 can be used as a microphone to apply signals to the amplifier 60 which are coupled through capacitor 64 and through switch 63 and through the connection previously described to the power amplifier 76 and to the instructor's speaker 70.

When switch 63 at the student unit 20 is moved to the left position, a ground is provided on the line 19a which is applied through the switch 87a and lamp hold circuit 96 to student indicator light 95. The lamp hold circuit 96 will be further explained. A separate light 95 is provided for each student, with light 95a being associated with student #1, light 95b with student #2, etc. A student can therefore call the instructor, but cannot communicate with the instructor unless the connection is established by the instructor either through the student's individual switch, or through the switch for his group, and the send/receive switch 84 must be in the receive position for the instructor to hear the message from the student. The call light is connected to the off side of the individual student selector switches 87 so a student after being selected cannot call the instructor.

The intercom control 16 also has provisions for applying a direct current signal over the control line to the student units. This potential is applied by switch 100 which in the dotted position applies potential from terminal 101 through filter 102 and through resistors 86 to the individual switches 87. The group switches 88 and 89 are also connected to the filter output so that either the individual or the group switches can apply the potential to the lines 19 to the student units. When switch 100 is not operated (in solid position), a smaller direct current potential is applied from terminal 103 to the switches 87, 88 and 89 so that clicking sounds do not result from operation of the switches.

Operation of individual switch 87a applies the direct current signal through line 19a and switch 63 to the filter 105 which passes this signal to driver amplifier 106. The driver amplifier 106 when triggered applies a potential through resistor 107 to the contact bar 58 of the student keyboard. This potential is applied through the contact 57 of an operated key on the student keyboard and through associated resistor 56 to the conductor 18. This potential will pass through filter 70 of the instructor's music rack light circuit and be amplified by amplifier 71 to energize the associated indicator light 72. Accordingly, by operating the switch 100 and the switch 87 for an individual student, the instructor can control the application of direct current potential to the student's keyboard so that the lights on his music rack will show the notes played by the selected student.

The student keyboard has in addition to the key contacts 57, additional contacts for actuating lights to show the notes played. Contacts 110 connected to the keys selectively engage contact rod 111 to which a positive potential can be applied by switch contact 112. Potential from the contacts 110 is applied through the diodes 113 to indicator lights 114 which are provided on a music rack at the student units. A further set of contacts 115 are brought into engagement with rod 116 by operation of the keys to conduct potential applied through switch 112 when in the dotted position. This potential is applied through diodes 117 to the lights 114. The connections from the switches 110 and 115 to lights 114 energize the lights so that they show notes played in either the treble or bass clef in accordance with the position of switch 112. The lights are used in combination with charts to show the position of the notes on the musical scale. The student can, therefore, select an indication of notes played on the staff of either the bass or treble clef.

Figure 3:
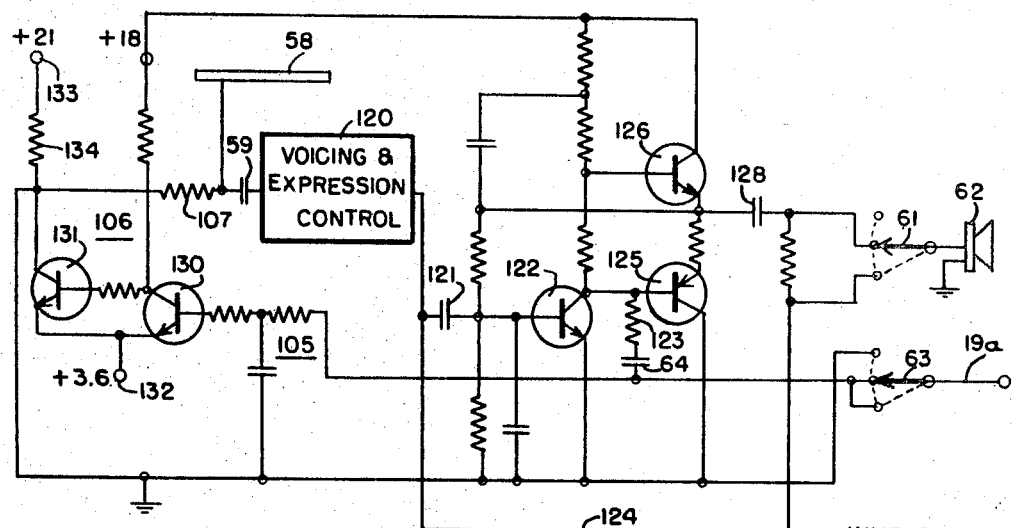
FIG. 3 is a circuit diagram of the electronic equipment at the student's unit.

FIG. 3 illustrates the detailed circuit of the equipment at each student unit. Signals picked up from the contact bar 58 of the student keyboard are applied through capacitor 59 to the voicing and expression control 120, which is part of the voicing and amplifier unit 60 in FIG. 2. The control 120 includes tone filters to provide some variety of tones as provided by electric organs, and a volume or swell control potentiometer to control the level of the sound. The output of unit 120 is applied through capacitor 121 to the base of transistor 122 which forms a pre-amplifier. The output from the collector of transistor 122 is applied through resistor 123, capacitor 64 and switch 63 to conductor 19a extending to the instructor's console. Thus, the tones selected by the student keyboard are applied to the intercom control 16 and the instructor can set the controls so that he can hear the music played by the student on his loudspeaker 77.

When the switch 61 of the student unit is in the talk position shown by dotted lines, the speaker 62 is connected through conductor 124 to the input side of the capacitor 12. By this connection the speaker, acting as a microphone, applies a signal to the pre-amplifier transistor 122 and the amplified signal is transmitted through resistor 123, capacitor 64 and switch 63 (dotted position) to the innercommunicating line 19a to the instructor. The output of the pre-amplifier 122 is also connected to the power amplifier including transistors 125 and 126, which are a complementary pair. The amplified output is applied through capacitor 128 and switch 61 (solid position) to the speaker 62. This permits the student to hear on the speaker the music which he plays.

Signals from the innercommunicating line 19a applied through switch 63 (solid position) are coupled through capacitor 64 and resistor 123 to the input of the power amplifier formed by transistors 125 and 126, and the amplified signals are applied through capacitor 128 and switch 61 to the speaker 62. This permits the student to listen to messages from the instructor, or to hear music played by the instructor or recordings applied at the intercom control unit.

It is to be pointed out that the speaker 62 at the student unit, as well as the speaker 77 at the instructor's console, can be replaced by headphones so that only the particular student or the instructor will hear the sounds reproduced. Jacks can be provided in a well known manner having contacts to automatically disconnect the speakers when the headphones are plugged in. The headphone jack at the student unit can be provided in the line between capacitor 128 and the center contact of the switch 61 so that this will not interfere with the use of speaker 62 as a microphone to apply an input to the pre-amplifier through switch 61 when in the dotted position.

The circuits of filter 105 and driver amplifier 106 for applying the light energizing potential to the contact rod 58 at the student keyboard are also shown in FIG. 3. The filter 105 receives the signal from line 19a through switch 63 and reduces the audio signals which are applied on the innercommunicating line with the DC signal. Driver amplifier 106 includes transistor 130 which is normally cut off and transistor 131 which is normally conducting. With transistor 131 conducting, the collector is at the potential applied to terminal 132, which is of the order of 3 volts. This potential applied through resistor 107 to the rod 58 is not sufficient when applied through the key contacts and conductors 18 to acuate the trigger amplifier 71 of the instructor's music rack light circuit. When the direct current potential is applied from line 19a through the filter 105 to the base of transistor 130, this causes transistor 130 to conduct. The collector potential therefore drops to the voltage at terminal 132, and this potential applied to the base of transistor 131 turns this transistor off. The collector of transistor 131 therefore rises to the potential at terminal 133, which may be of the order of 21 volts. This potential is applied through resistors 134 and 107 to the rod 58 at the student's keyboard. This voltage will be applied through the actuated key contacts at the student keyboard and conductors 18 to the filters 70 and amplifiers 71 at the instructor's music rack, as previously described.

FIG. 4 shows the circuit used to energize the lights at the instructor's music rack. The potential on conductor 18 is applied through filter 70 which reduces the audio signal which is present on conductor 18. Transistors 140 and 141 operate in generally the same way as transistors 130 and 131 in the rod driver circuit (FIG. 3). The positive potential applied to the base of transistor 140 turns this transistor on so that the collector voltage drops, and this voltage is applied to the base of transistor 141 to turn this transistor off. The increased voltage at the collector of transistor 141 when this transistor is turned off is applied to the base of transistor 142 to turn on this transistor. A potential of 3 or 4 volts is applied to the emitter of transistor 142 from termimal 143, and the lamp 72 is connected to the positive 21 volt potential so that a voltage of 17 or 18 volts is applied across the lamp to cause the same to be illuminated.

Although the circuit in FIG. 2 provides conductive paths through which signals can be sent from the instructor to the students, because of the large value of the isolating resistors 86, 90 and 91, the signal path has high impedance to attenuate the signals by a significant amount. To eliminate this attenuation diodes are provided across the isolating resistors, and in the send position of switch 84 these diodes are rendered conducting to provide a low impedance signal path. The complete circuit of the intercom control unit including the bypassing diodes is shown in FIG. 5. FIG. 5 illustrates a system having two groups of students with 4 students in each group. It is obvious that a larger number of students could be provided in each group and also that additional groups can be provided by the connectors illustrated.

As seen in FIG. 5, the send/receive switch 84, has additional contacts 84a, 84b and 84c, which are not shown in FIG. 2. Contacts 84a and 84b selectively apply bias voltages to diodes 150 and 151 to apply signals through the switches 87 to the student lines 19. Contact 84c acts to ground the microphone 81 when the switch is in the receive position. The group switches 88 and 89 also include additional contacts 88a and 88b, and 89a and 89b, respectively. These additional contacts provide bias to diodes 160 to 167 to selectively render the same conductive.

A pair of diodes 150a, 151a; 150b, 151b etc. is provided for applying the signal to each student line 19a, 19b etc. When switch 84 is in the receive position, contacts 84a and 84b apply potential to the diodes 150 and 151 to hold the same non-conductive. This is because a positive potential is applied from the voltage divider including resistors 147, 148, 149 through contact 84a to the cathodes of diodes 150, and ground is applied through contact 84b to the anodes of diodes 151. When the switch 84 is in the send position, the positive potential is applied through resistors 149 and 152 to the anodes of diodes 151, and the cathodes of diodes 150 are connected through resistor 153 to ground.

The audio signals are therefore applied from the output of power amplifier 76 through capacitor 155, contact 84a, the conducting diodes 150a, 150b etc. and capacitors 157a, 157b etc. to the contacts of switches 87a, 87b etc. connected to the lines 19a, 19b extending to the individual student units. Capacitor 156, contact 84b and conducting diodes 151 provide parallel paths for the audio signal so that the circuits from power amplifier 76 to the lines 19 have low impedance. In the event that switch 87b is closed (as shown), the signal will be applied through conductor 19b to the student unit 21. This signal can be utilized in the manner previously described.

In the event that the group switch 88 is closed, when the switch 84 is in the send position, the additional contacts 88a and 88b thereof will provide potential to render diodes 160 to 167 conducting. A positive potential is then applied through resistors 149 and 152 and switch contacts 84b and 88b to the anodes of diodes 161, 163, 165 and 167, and through these diodes to diodes 160, 162, 164 and 166 respectively, and from the cathodes thereof through switch contacts 88a and 84a and resistor 153 to ground. When the diodes 160 to 167 are conducting, the signal passes through parallel paths from capacitors 155 and 156 through contacts 84a and 88a to the diodes 160, 162, 164 and 166 and through contacts 84b and 88b to the diodes 161, 163, 165 and 167. The center connection between each pair of diodes is connected through a capacitor 169 to the normally closed contact of one of the individual switches 87 which connect to the lines 19 extending to the student units of the first group. This provides a low impedance path from the power amplifier 76 to the conductors 19 for applying signals to the student units of one group. FIG. 5 shows the switch 89 and contacts 89a and 89b thereof for making connections to the student units of a second group, and it is obvious that additional units can be connected in the same manner.

FIG. 5 also shows the lamp-hold circuit 96 at the intercom control unit which actuates the student indicator lights 95. As previously stated, when the switch 63 at the student unit is in the call (left) position a ground is applied to line 19a, and this is applied through diode 170 to the base of transistor 171. This turns transistor 171 off causing the potential at its collector to rise to the B+ level through resistor 172. This high potential is then applied to the base of transistor 174 through resistor 175. This potential will bias transistor 174 into conduction causing current to flow from its emitter out the collector and through lamp 95a to B+, causing the lamp to light. The potential at the collector of transistor 174 will then drop to near zero, and this potential is passed on to the base of transistor 171 through resistor 176 holding the base of transistor 171 at a level low enough to keep this transistor biased to non-conduction. This condition will cause the lamp 95a to remain lit signalling the teacher that a student is calling.

The lamp hold circuit 96 includes a switch 187a ganged with switch 87a. When the teacher operates switches 87a and 187a to the left position, the base of transistor 174 will be shorted to ground through contacts of switch 187a, biasing transistor 174 to non-conduction, causing the lamp to go out. The B+ potential is therefore applied through resistor 176 to the base of transistor 171 to bias this transistor into conduction. The collector of transistor 171 will drop and this drop is applied through resistor 175 to the base of transistor 174 to bring the same to a low level to turn off transistor 174 holding the lamp in an off condition until the student again calls. Diode 170 protects the base of transistor 171 from the normal positive potential on line 19. The capacitor 177 bypasses transients and prevents them from turning on the lamp circuit.

As shown in FIG. 2, the intercom control has a delay turn off unit 74 to which signals are applied from the output of power amplifier 76, as well as from the group switches 88 and 89 when in the off position. Accordingly, a signal is applied to the delay turn off unit whenever there is any activity originated either by the instructor at the intercom control or by any of the student units. The delay turn off unit acts to turn off the power supply in the event that the system is not used for a given period of time. The connections to the delay turn off unit are also shown in FIG. 5.

As previously stated the lamps on the music rack for the instructor as well as for the student can be used with charts to show the poistion of the notes played on the scale. For each black key on the keyboard, two lights can be provided in parallel and positioned differently to indicate sharp and flat notes. Accordingly, charts used for musical keys which includes sharp notes can be properly represented as well as for musical keys which include flat notes. This is indicated by the lamps 72a and 72b on the instructor's music rack, and the lamps 114a and 114b at the student unit #1, shown in FIG. 2.

The system of the invention has been found to be a very valuable aid in the teaching of a class of students to play electric organs. The system can be used for other electrical instruments wherein electric tone generators provide the signals which are keyed and reproduced by keyboards. Inasmuch as a single intercom conductor is required for connection from the instructor's console to the individual student units, and the conductors providing the tones can be common to all of the student units, the cabling required is held to a minimum. At the same time, facilities are provided for effective communication between the instructor and the student and for control by the instructor so he can listen to or observe on the lights the notes which are actually played by any student.

We claim:

1. An electronic music instrument teaching aid including in combination, an instructor unit including a keyboard, a plurality of student units each including a keyboard, tone generator means providing tones of a plurality of different frequencies, a plurality of tone conductors extending from said generator means to said instructor keyboard and to each of said student keyboards for applying said tones thereto, means providing individual conducting paths from said instructor unit to each of said student units, and control means at said instructor unit including switch means for selectively establishing a conducting path to a particular student unit.

2. A teaching aid in accordance with claim 1 wherein said means providing individual conducting paths from said instructor unit to each of said student units includes a single intercom conductor extending from said instructor unit to each of said student units.

3. A teaching aid in accordance with claim 2 wherein each student unit includes control means for selectively applying signals from said keyboard thereat to said single intercom conductor extending therefrom to said instructor unit.

4. A teaching aid in accordance with claim 2 wherein each student unit includes amplifier means, audio transducing means, and switch means for selectively applying signals from said audio transducing means through said amplifier means to said intercom conductor, and for applying signals from said intercom conductor through said amplifier means to said audio transducing means.

5. A teaching aid in accordance with claim 2 wherein said control means at said instructor's unit includes resistor means connected to said switch means for isolating the same, and diode means selectively bypassing said resistor means for applying signals from said control means to said intercom conductor.

6. A teaching aid in accordance with claim 2 wherein said student units are arranged in groups and said switch means includes means for connecting said control means to the intercom conductors of said student units, and means for selectively connecting said control means to the intercom conductors associated with student units of a group of student units.

7. A teaching aid in accordance with claim 2 wherein said control units include amplifier means and switch means for selectively applying signals from said amplifier means to said intercom conductors and from said intercom conductors to said amplifier means.

8. A teaching aid in accordance with claim 7 wherein said control means at said instructor unit includes audio transducer means, and means for applying signals from said audio transducer means through said amplifier means and said switch means to said intercom conductors, and for applying signals from said intercom conductors through said switch means and said amplifier means to said audio transducer means.

9. A teaching aid in accordance with claim 8 wherein each student unit includes a control means, and said keyboard at each student unit includes keys and switch contacts for applying signals from said tone conductors to said control means of said student unit, and such control means is connected to said means providing individual conducting paths and responds to signals applied thereto from said instructor unit to apply a direct current potential to said contacts.

10. A teaching aid in accordance with claim 1 further including a plurality of indicators at said instructor unit individually connected to said conductors and individually associated with said tones, means at said instructor's unit for selectively applying a control signal over the selected conducting path to a particular student unit, and means at each student unit responsive to said control signal for applying potentials through said keyboard thereat to said tone conductors for selectively energizing said indicators.

11. A teaching aid in accordance with claim 9 wherein said indicators are lights, and a pair of lights are provided for each black key of said keyboard at said student unit.

12. A teaching aid in accordance with claim 1 further including a plurality of indicators at each student unit individually coupled to said keys of said keyboard thereat, with each black key having a pair of indicators connected thereto.

13. An electronic music instrument teaching aid including in combination, an instructor unit including a keyboard, a plurality of student units spaced from said instructor unit and from each other and each including a keyboard, common tone generator means providing tones of a plurality of different frequencies representing musical notes, a plurality of conductors extending from said tone generator means to said instructor keyboard and to each of said student keyboards for applying said tones thereto, each of said student units including voicing and expression control means and reproducing means connected to said voicing and expression control means, said keyboard at each student unit selectively applying signals from said conductors to said voicing and expression control means thereat for application to said reproducing means, whereby each student unit can selectively control the tones being produced and the voicing and expression thereof.

14. A teaching aid in accordance with claim 13 further including a plurality of indicators at said instructor unit individually coupled to said conductors and associated with said tones, and means at each student unit for applying potentials to said conductors by operation of said keyboard thereat for selectively energizing said indicators at said instructor unit.

15. A teaching aid in accordance with claim 13 wherein each student unit includes a music rack and a plurality of indicator lights on said rack individually coupled to the keys of said keyboard thereat for indicating the notes played by operation of said keyboard.

16. A teaching aid in accordance with claim 15 including a chart with a musical scale thereon positioned on said music rack of at least one student unit and cooperating with said indicator lights to indicate the position on the scale of the notes being played.

17. A teaching aid in accordance with claim 16 wherein said keyboard includes black keys for producing sharp and flat notes, and a pair of indicator lights are provided for each black key with one light of each pair representing a sharp note and the other light representing a flat note, and wherein said chart cooperates with one light of each pair.

References Cited

UNITED STATES PATENTS

| | | | |
|---|---|---|---|
| 1,613,400 | 1/1927 | McAleavey | 84—477 |
| 3,270,438 | 9/1966 | Ephraim | 35—5 |
| 3,353,435 | 11/1967 | Schmoyer | 84—478 |

RICHARD B. WILKINSON, Primary Examiner

LAWRENCE R. FRANKLIN, Assistant Examiner

U.S. Cl. X.R.

35—5; 84—478